United States Patent
Bollinger et al.

(10) Patent No.: US 6,415,876 B1
(45) Date of Patent: Jul. 9, 2002

(54) HAND-HELD TOOL WITH A LINEAR OSCILLATING DRIVE

(75) Inventors: Heinrich Bollinger, Thayngen; Max Keller, Schaffhausen, both of (CH)

(73) Assignee: Biax-Maschinen GmbH, Steckborn (CH)

( * ) Notice: Subject to any disclaimer, the term of this patent is extended or adjusted under 35 U.S.C. 154(b) by 0 days.

(21) Appl. No.: 09/529,790
(22) PCT Filed: Oct. 5, 1998
(86) PCT No.: PCT/CH99/00424
§ 371 (c)(1),
(2), (4) Date: Apr. 20, 2000
(87) PCT Pub. No.: WO98/20424
PCT Pub. Date: Apr. 29, 1999

(30) Foreign Application Priority Data

Oct. 21, 1997 (DE) .......................................... 197 46 447

(51) Int. Cl.[7] .................................................. B25F 5/00
(52) U.S. Cl. .................... 173/135; 173/138; 173/162.1; 173/210
(58) Field of Search ................................ 173/135, 138, 173/121, 114, 116, 11, 210, 212, 162.2, 162.1, 168

(56) References Cited

U.S. PATENT DOCUMENTS

| | | | |
|---|---|---|---|
| 3,241,459 A | 3/1966 | Pirrello | |
| 4,681,172 A | * 7/1987 | Mikiya et al. | 173/162.1 |
| 4,864,727 A | 9/1989 | Chu | |
| 5,163,519 A | * 11/1992 | Mead et al. | 173/211 |
| 5,259,463 A | * 11/1993 | Bodell et al. | 173/138 |
| 5,279,120 A | * 1/1994 | Sasaki | 173/135 |
| 5,586,606 A | * 12/1996 | Kimberlin et al. | 173/138 |
| 5,626,199 A | * 5/1997 | Henry et al. | 173/162.1 |

FOREIGN PATENT DOCUMENTS

| | | |
|---|---|---|
| DE | 32 12 701 A | 11/1982 |
| EP | 0 089 311 | 9/1983 |

* cited by examiner

Primary Examiner—Scott A. Smith
(74) Attorney, Agent, or Firm—Browdy and Neimark, P.L.L.C.

(57) ABSTRACT

A motor housing (11) is mounted in a handle body (10) so as to slide in the longitudinal direction. A tubular pipe (37) that can slide in a bore (38) of the body (10) projects from the back of the housing (11). Compressed air can be applied to the bore (38) through a switching valve (40). A piston (14) with a piston rod (17) can slide in the housing and a tool can be secured to its front end. A flutter valve (23) which alternatingly connects the bore (38) to the two cylinder chambers (27, 28) is built into the valve housing (22). The piston (14) alternatingly opens the connection to an outgoing air conduit (29–31). A pre-stressed spring (47) is set between the body (10) and the housing (11). In operation, the housing (11) oscillates out of step with the piston (14), so that their initial forces are largely compensated and no vibrations are transmitted to the handle body (10).

9 Claims, 1 Drawing Sheet

HAND-HELD TOOL WITH A LINEAR OSCILLATING DRIVE

CROSS REFERENCE TO RELATED APPLICATION

The present application is the national stage under 35 U.S.C. 371 of PCT/CH98/00424, filed Oct. 5, 1998.

BACKGROUND OF THE INVENTION

1. Technical Field of the Invention

Handtools with a pneumatic linear vibrating drive are known. They are used to saw, grind, polish, file and cut workpieces. The vibrating drive comprises a piston which is mounted displaceably in the handle and has a piston rod, to the front of which a tool holder is attached. The piston is driven by a flutter valve which alternately connects a cylinder chamber to the feed pressure which is supplied via a manually actuated pilot valve and to an exhaust air duct.

2. Prior Art

EP-A-89 311 has disclosed a vibration damper for such a handtool. A damper mass is mounted in such a manner that it can be displaced in the longitudinal direction in the casing and is supported with respect to the casing by means of rubber springs. However, this vibration damper increases the length of the structure and is frequency-dependent.

Moreover, DE-A-32 12 701 has disclosed a pneumatic hammer as described in the preamble of Claim 1. The hammer has a tool casing with a linear vibrating drive. The latter comprises a motor casing which can be displaced in the longitudinal direction in the tool casing. A piston with a piston rod is inserted in a coaxial boring in the motor casing, the front end of which piston rod strikes a tool which is mounted displaceably in the tool casing. A flutter valve is incorporated in the motor casing. Compressed air is applied to the flutter valve via an annular chamber which surrounds the motor casing and via a pilot valve. The flutter valve alternately connects the annular chamber to the two cylinder chambers on either side of the piston. The piston alternately opens the connection between the cylinder chambers and an exhaust air duct. A prestressed compression spring exerts a forwardly directed load on the motor casing. This design requires a relatively large diameter of the tool casing. The piston has a relatively small active area in the direction of return travel, since the return travel merely involves "drawing back" for the next impact, and there is no need for any work to be output.

OBJECT OF THE INVENTION

The invention is based on the object of providing a handtool of the type described in the introduction which allows efficient vibration damping combined with a short structure and a small external diameter.

BRIEF DESCRIPTION OF THE DRAWINGS

An exemplary embodiment of the invention is explained below with reference to the drawing, in which the only figure shows a longitudinal section through a handtool according to the invention.

DETAILED DESCRIPTION OF THE PREFERRED EMBODIMENTS(S) OF THE INVENTION

Figure 1:
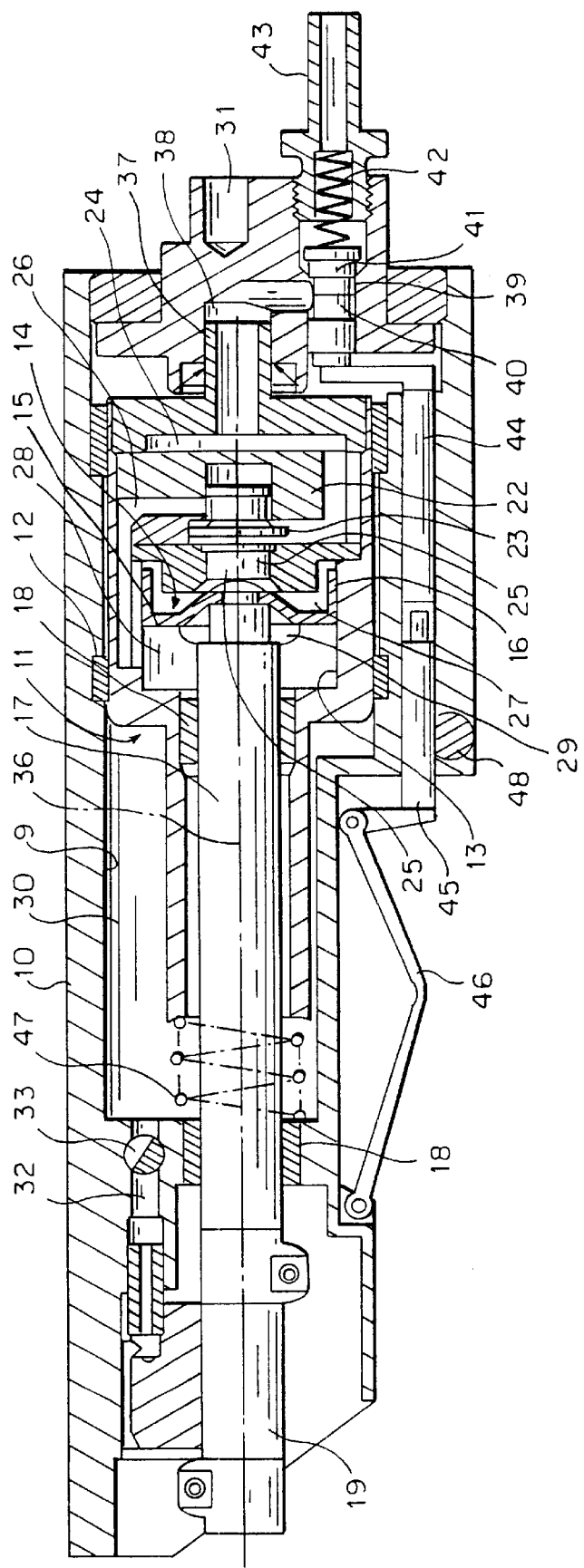

A motor casing 11 is mounted displaceably, on PTFE rings 12, in a cylindrical boring 9 in a handle 10. The casing 11 has a coaxial boring 13, in which a piston 14 is reciprocatingly mounted. The piston base 15 is thin-walled and convex and, at its periphery, merges into a thin-walled cylindrical sleeve 16. The piston 14 is connected to a coaxial piston rod 17 made from an aluminium alloy which is anodized. PTFE is incorporated in the anodized layer. This design of piston and piston rod provides them with a low mass. Consequently, the reaction forces which have to be damped are also reduced. The piston rod 17 is mounted displaceably in two sliding-contact bearings 18 in the handle 10 and in the casing 11. The rear sliding-contact bearing 18 at the same time serves as a seal for the front cylinder chamber 28. A tool holder 19 which may, for example, be designed and mounted as described in German Patent No. 29 39 896, is attached to the front end of the piston rod 17.

At the rear end of the motor casing 11, a valve casing 22 is installed, with a flutter valve 23 which is known per se and, in operation, alternately connects an supply air duct 24 to the two cylinder chambers 27, 28 on either side of the piston 14, via ducts 25, 26. The exhaust air from the cylinder chambers 27, 28 is alternately exhausted via the exhaust duct 29 into the chamber 30 in front of the casing 11 and from this in turn, angularly displaced, to an outlet opening 31 via a further duct. This design provides efficient silencing without increasing the length of the structure. Moreover, the exhaust air which flows through cools the sliding-contact bearings 18 of the piston rod 17. A blow-off duct 32, which opens out next to the front end of the piston rod 17, approximately in the axial direction of the latter, branches off from the chamber 30. The duct 32 can be closed by means of a rotary valve 33. If the tool is used, for example, for sawing, the sawdust can be continuously blown away when the valve 33 is open. The above-described guidance of the exhaust air thus has the three functions of silencing, cooling and blowing.

A cylindrical sleeve 37, which is guided in a sealed manner in a boring 38 in the handle 10, is formed integrally on the valve casing 22, coaxially with respect to the axis 36 of the piston rod 17. The boring 38 is connected to the valve chamber 39 of a seat valve 40. The valve body 41 of the valve 40 can move in the direction of the axis 36 and is loaded in its closing direction by a spring 42. A hose is connected to the compressed-air connection 43 of the valve 30. The valve body 41 is actuated by means of a rod 44 which is mounted displaceably in the handle 10. A slide 45 presses against the front end of the rod 44. The rear end of a toggle actuating lever 46, the front end of which is articulatedly mounted on the handle 10, is articulatedly mounted on the slide 45. This actuating lever 46 is arranged on a narrowed front part of the handle 10, in front of the motor casing 11. This provides a slender design. The tool can be switched on even by small hands without it being necessary to adjust the grip.

The feed pressure multiplied by the cross section of the boring 38 results in a force on the casing 11 which is compensated for by a spring 47. The spring 47 is clamped between casing 11 and handle 10. Its preloading is such that, when the compressed air is switched on, the casing 11 is approximately in a position slightly behind the central position of the maximum travel of the casing 11 in the handle 10. To prevent the tool from being switched on unintentionally when it is picked up, the slide 45 is blocked by a spring-loaded transverse slide 48 which can be manually displaced sideways and has a circumferential groove which releases the slide 45.

In operation, for filing or sawing the lever 46 is pressed so that compressed air is applied to the flutter valve 23 and the piston 14 vibrates in a reciprocating manner. The casing 11 vibrates with a 180° phase shift, so that the reaction forces from the piston movement are virtually completely compensated for. The centre of gravity of the motor casing 11 lies on the axis 36, so that there are also no oscillating torques. This makes it possible to work accurately and without fatigue. The vibration damping is frequency-independent.

The above-described solution of the exhaust air guidance which is also suitable for blowing out and acts as a silencer, and the above-described valve actuation using a toggle actuating lever 46 may also be used to good effect in other handtools.

What is claimed is:

1. Handtool with a linear vibrating drive, comprising a tool casing, a motor casing (11) which is displaceably mounted in a longitudinal direction in the tool casing, a piston (14) inserted into a first boring (13) in the motor casing (11) having a piston rod (17), a front end of which interacts with a tool, a flutter valve (23), inserted in a valve casing (22) in the motor casing (11) and alternately connects an outlet of a pilot valve (40) to two cylinder chambers (27, 28) on opposite sides of the piston (14), the piston (14) alternately opening a connection to an exhaust air duct (29–31), and a prestressed compression spring (47) between the tool casing and the motor casing (11), wherein the tool casing is designed as a handle (10), a cylindrical, tubular connection piece (37) projects backwards from the motor casing (11), the connection piece is displaceable and sealingly accommodated in a second boring (38) in the handle (10), compressed air being supplied to the second boring (38) via the pilot valve (40), wherein the tubular connection piece (37) is connected to the flutter valve (23), the compression spring (47) prestresses the motor casing (11) in a backwards direction, the motor casing (11) is prestressed by feed pressure in an opposite direction to a force of the compression spring (47), the piston rod (17) is guided in a sliding-contact bearing (18) in the motor casing (11), and the front end of the piston rod (17) is formed for attachment of the tool.

2. Tool according to claim 1, in which a closable blow-off duct (32), which is directed forwards and opens out next to the front end of the piston rod (17), branches off from the exhaust air duct (29–31).

3. Tool according to claim 1, in which the piston rod (17) consists of an aluminum alloy.

4. Tool according to claim 3, in which at least sliding surfaces of the piston rod (17) have an anodized layer preferably containing PTFE.

5. Tool according to claim 1, in which an actuating lever (46) of the pilot valve (40) is arranged in a narrowed front part of the handle (10) in front of the motor casing (11).

6. Tool according to claims 5, in which the actuating lever (46) is a toggle, a front end of which is articulatedly mounted on the handle (10) and a rear end of which is articulatedly mounted on an actuating linkage (44, 45) of the pilot valve (40).

7. Tool according to claim 1, in which a valve member of the pilot valve (40) can move in the longitudinal direction of the handle (10).

8. Tool according to claim 1, in which a center of gravity of the motor casing (11) lies approximately at an axis (36) of the piston rod (17).

9. Tool according to claim 1, in which the motor casing (11) is mounted in the handle (10) by means of PTFE rings.

* * * * *